July 28, 1931.  R. POHL  1,816,795
DYNAMO ELECTRIC MACHINE
Filed March 22, 1929
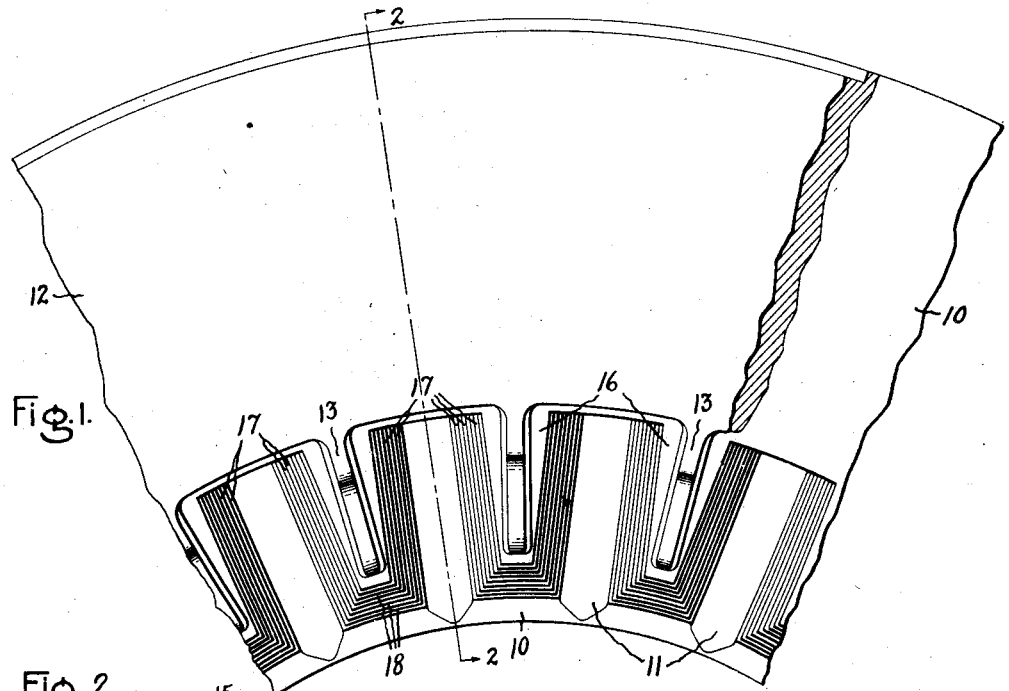
Fig.1.
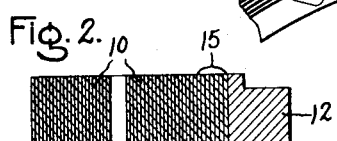
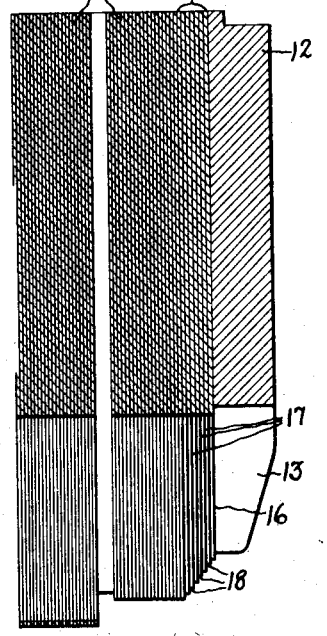
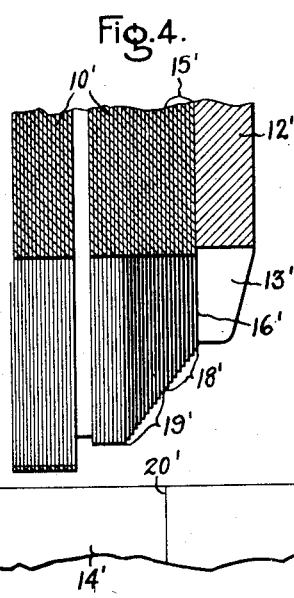
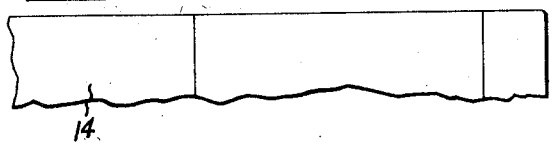
Inventor:
Robert Pohl,
by Charles E. Tullar
His Attorney.

Patented July 28, 1931

1,816,795

UNITED STATES PATENT OFFICE

ROBERT POHL, OF BERLIN, GERMANY, ASSIGNOR TO GENERAL ELECTRIC COMPANY, A CORPORATION OF NEW YORK

DYNAMO ELECTRIC MACHINE

Application filed March 22, 1929, Serial No. 349,199, and in Germany August 3, 1928.

My invention relates to an arrangement for diminishing eddy current losses due to the end stray field in electrical machines.

Rotating stray fields at the ends of electrical machines produce eddy currents in the adjacent parts of the machine which cause heating. These eddy currents arise not only in the solid structural parts of the machine, but also in the laminated portions of the active iron if the end stray field enters the sides of the laminations.

The object of my invention is to provide an arrangement of the laminations in an electrical machine which facilitates the end stray field flux entering the edges of the laminations of the machine and which prevents the end stray field entering the sides of the laminations. I accomplish this by providing a group of laminations adjacent the end of the machine having teeth of different width extending between the slots of the machine so as to expose the flanks of the teeth of this group of laminations to the end stray field flux and thereby reduce eddy current losses in the machine.

My invention will be fully set forth in the following description referring to the accompanying drawing and the features of novelty which characterize my invention will be set forth with particularity in the claims annexed to and forming a part of this specification.

In the drawings Fig. 1 is a fragmentary end elevation of the stator of a dynamo electric machine embodying my invention; Fig. 2 is a sectional view substantially on the line 2—2 of Fig. 1; Fig. 3 is a modification of the construction shown in Figs. 1 and 2 in which stepping of the laminations presented toward the rotor is extended into the active iron thereof, and Fig. 4 is a sectional view on the line 4—4 of Fig. 3.

Referring to the drawings, the dynamo electric machine in connection with which I have illustrated my invention includes the usual stator laminations 10 having closed winding slots 11 therein. These laminations are supported in the machine between clamping covers 12 having narrow integral clamping fingers 13. This stator substantially conforms to a rotor 14 which is supported coaxially of the stator in the usual manner by a shaft and bearings.

In accordance with my invention a group of laminations 15 adjacent the end of the stator are formed with teeth 16 extending between the slots 11 which are of different width and preferably successively decreasing in width from the main body of the laminations 10 toward the clamping cover 12 so as to form inclined steps 17 at the opposite sides of the ends of the stator slots 11. The teeth 16 of this group of laminations 15 are also at different distances from the axis of the stator and preferably successively decrease in length from the main body of laminations 10 toward the clamping cover 12 so as to form inclined steps 18 presented toward the rotor 14 of the machine. Although the inclined steps 17 and 18 may be arranged as desired in any particular machine, for the best results I have found that the steps should be inclined from 30 to 45 degrees with respect to the axis of the slots 11.

It will be observed that by this construction the flanks or side edges of the group of laminations 15 and the edges presented toward the rotor 14 are all exposed to the end stray field flux of the machine, so that the end stray field flux enters the edges of these laminations. As a result, eddy current losses due to the end stray field flux of the machine is reduced as compared with machines of prior construction in which the end stray field flux either entered the sides of the laminations or solid clamping fingers which induced excessive eddy currents therein and caused objectionable heating. Moreover, stepping of the flanks of the teeth 16 has the further advantage of affording ample space for increasing the thickness of the winding insulation at the ends of the stator slots for corona protection if desired.

In the form of my invention shown in Figs. 3 and 4 the stator shown is similar to that shown in Figs. 1 and 2 and comprises laminations 10' having slots 11' and retained in place by clamping cover 12' provided with narrow integral teeth 13'.

In accordance with my invention a group of laminations 15' are formed with teeth 16' of different width extending between the slots 11', which successively decrease in width from the main body of laminations 10' toward the clamping cover 12' so as to form steps 17' inclined with respect to the axis of windings slots 11 to facilitate the entrance of the end stray field flux into the edges of the laminations.

In this construction the edges of the group 15' of laminations presented toward the rotor 14' are arranged to form inclined steps 18' between the edge 20' of the binding band 21' and the clamping cover 12'. The edges presented toward the rotor 14' of part of the laminations 10' constituting the active iron of the stator are also stepped between the edge of the binding band and the main body of the stator laminations. The steps 19' form a continuation of the steps 18', but the flanks or sides of the teeth forming the steps 19' are in alignment with the sides of the stator slots 11', although, if desired, the sides of these laminations may also be arranged in steps. As pointed out in the description of Figs. 1 and 2 the inclination of the steps 17', 18' and 19' should be, for the best results, between 30 and 45 degrees with respect to the axis of the slots 11'.

Modifications of the particular form of my invention disclosed will occur to those skilled in the art, so that I desire it to be understood that my invention is not to be limited to the particular arrangement shown and described, and I intend in the appended claim to cover all modifications which do not depart from the spirit and scope of my invention.

What I claim as new and desire to secure by Letters Patent of the United States is:

1. A dynamo electric machine having a slotted, laminated stator adapted to substantially conform to a rotor, and a group of laminations adjacent the end of the stator having teeth between said slots with the edges presented thereto arranged in inclined steps so as to expose the edges of said teeth to the end stray field flux and thereby reduce eddy current losses in said stator.

2. A dynamo electric machine having a slotted, laminated stator adapted to substantially conform to a rotor, and a group of laminations adjacent the end of the stator having teeth of successively smaller width between said slots and having the edges presented toward the axis of the stator at successively greater distance therefrom so as to expose the ends and flanks of said teeth to the end stray field flux and thereby reduce eddy current losses in said stator.

3. A dynamo electric machine having a slotted, laminated stator adapted to substantially conform to a rotor, and a group of laminations adjacent the end of the stator having teeth between said slots with edges presented thereto arranged in inclined steps and having edges presented toward the stator axis arranged in steps inclined with respect thereto so as to expose the ends and flanks of said teeth to the end stray field flux and thereby reduce eddy current losses in said stator.

4. A dynamo electric machine having a slotted, laminated stator adapted to substantially conform to a rotor, and a group of laminations adjacent the ends of the stator having teeth between said slots with the edges presented thereto arranged in steps inclined at an angle of at least thirty degrees to said slots, so as to expose the edges of said teeth to the end stray field flux and thereby reduce eddy current losses in said stator.

5. A dynamo electric machine having a slotted, laminated stator adapted to substantially conform to a rotor, and a group of laminations adjacent the end of the stator having teeth between said slots with edges presented thereto arranged in inclined steps and having edges presented in steps inclined with respect thereto so as to expose the ends and flanks of said teeth to the end stray field flux and thereby reduce eddy current losses in said stator, the steps formed by said laminations being inclined at an angle of at least thirty degrees to said slots.

In witness whereof, I have hereunto set my hand this 5th day of March, 1929.

ROBERT POHL.